(12) United States Patent
Ogura et al.

(10) Patent No.: US 10,978,919 B2
(45) Date of Patent: Apr. 13, 2021

(54) ELECTRIC POWER TRANSMISSION DEVICE AND ELECTRIC POWER TRANSMISSION SYSTEM

(71) Applicant: KABUSHIKI KAISHA TOSHIBA, Tokyo (JP)

(72) Inventors: Koji Ogura, Tachikawa Tokyo (JP); Tetsu Shijo, Setagaya Tokyo (JP); Masatoshi Suzuki, Susono Shizuoka (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 212 days.

(21) Appl. No.: 16/127,854

(22) Filed: Sep. 11, 2018

(65) Prior Publication Data

US 2019/0288568 A1  Sep. 19, 2019

(30) Foreign Application Priority Data

Mar. 13, 2018 (JP) .............................. JP2018-045832

(51) Int. Cl.
*H02J 50/70* (2016.01)
*H02J 50/10* (2016.01)

(52) U.S. Cl.
CPC .............. *H02J 50/70* (2016.02); *H02J 50/10* (2016.02)

(58) Field of Classification Search
None
See application file for complete search history.

(56) References Cited

U.S. PATENT DOCUMENTS

| 2010/0033021 | A1* | 2/2010 | Bennett ................... H02J 50/12 307/104 |
| 2012/0032521 | A1 | 2/2012 | Inoue et al. |
| 2012/0086281 | A1* | 4/2012 | Kanno ................... H01Q 1/248 307/82 |
| 2017/0012477 | A1 | 1/2017 | Shijo et al. |
| 2018/0269717 | A1 | 9/2018 | Shijo et al. |
| 2019/0006843 | A1 | 1/2019 | Suzuki et al. |

FOREIGN PATENT DOCUMENTS

| JP | 2010193598 A | 9/2010 |
| JP | 2015033316 A | 2/2015 |
| JP | 2018157614 A | 10/2018 |

(Continued)

OTHER PUBLICATIONS

U.S. Appl. No. 15/916,911, filed Mar. 9, 2018, First Named Inventor: Masatoshi Suzuki, Title: "Power Transmission Device and Power Reception Device".

(Continued)

*Primary Examiner* — Jared Fureman
*Assistant Examiner* — Aqeel H Bukhari
(74) *Attorney, Agent, or Firm* — Holtz, Holtz & Volek PC

(57) ABSTRACT

An electric power transmission device as an aspect of the present invention includes a plurality of power transmitters configured to respectively generate magnetic fields. Phases of the respective magnetic fields are set such that the respective magnetic fields cancel out each other. The power transmitters sequentially shift frequencies of the respective magnetic fields to the same value at the same timing. A shift width of each of the frequencies for one-time shifting is limited by an upper limit value.

15 Claims, 12 Drawing Sheets

(56) References Cited

FOREIGN PATENT DOCUMENTS

JP          2019017134 A      1/2019
WO        2015189976 A1    12/2015

OTHER PUBLICATIONS

Kent Inoue, et al., "Reduction on Radiation Noise Level for Inductive Power Transfer Systems with Spread Spectrum focusing on Combined Impedance of Coils and Capacitor", IEEE Energy Conversion Congr. Expo, Sep. 2016.

Hongseok Kim, et al., "EMI Reduction in Wireless Power Transfer System Using Spread Spectrum Frequency Dithering", IEEE Wireless Power Transfer Conference 2016.

Josep Balcells, et al., "EMI Reduction in Switched Power Converters Using Frequency Modulation Techniques", IEEE Transactions on Electromagnetic Compatibility, vol. 47, No. 3, Aug. 2005, pp. 569-576.

\* cited by examiner

ELECTRIC POWER TRANSMISSION DEVICE AND ELECTRIC POWER TRANSMISSION SYSTEM

CROSS-REFERENCE TO RELATED APPLICATION(S)

This application is based upon and claims the benefit of priority from Japanese Patent Application No. 2018-045832, filed Mar. 13, 2018; the entire contents of which are incorporated herein by reference.

FIELD

Embodiments described herein relate generally to an electric power transmission device and an electric power transmission system.

BACKGROUND

Contactless electric power transmission (contactless power supplying) from an electric power transmission device to an electric power reception device is becoming widespread. In the contactless power supplying, a power transmission circuit generates a radio frequency (high-frequency) current with a predetermined frequency. A power transmission coil is excited by the radio frequency current and power is transmitted through a magnetic field generated by the excitation. However, in the contactless power supplying, a magnetic field having leaked outside (leakage magnetic field) might interfere with broadcasting, wireless communication, and the like. Therefore, in the contactless power supplying, it is necessary to reduce a leakage magnetic field so as to satisfy a limit regarding an upper limit value of the leakage magnetic field, defined by the international standard, and the like.

Meanwhile, high-power supplying has been desired for charging a high-capacity battery of an electric vehicle (EV) and the like in a short period of time. When the contactless high-power supplying is performed, an amount of radio frequency current flowing through the coil increases, which inevitably causes the leakage magnetic field to increase. Thus, the development of a new technology for reducing the leakage magnetic field has been desired.

DETAILED DESCRIPTION

Figure 1:
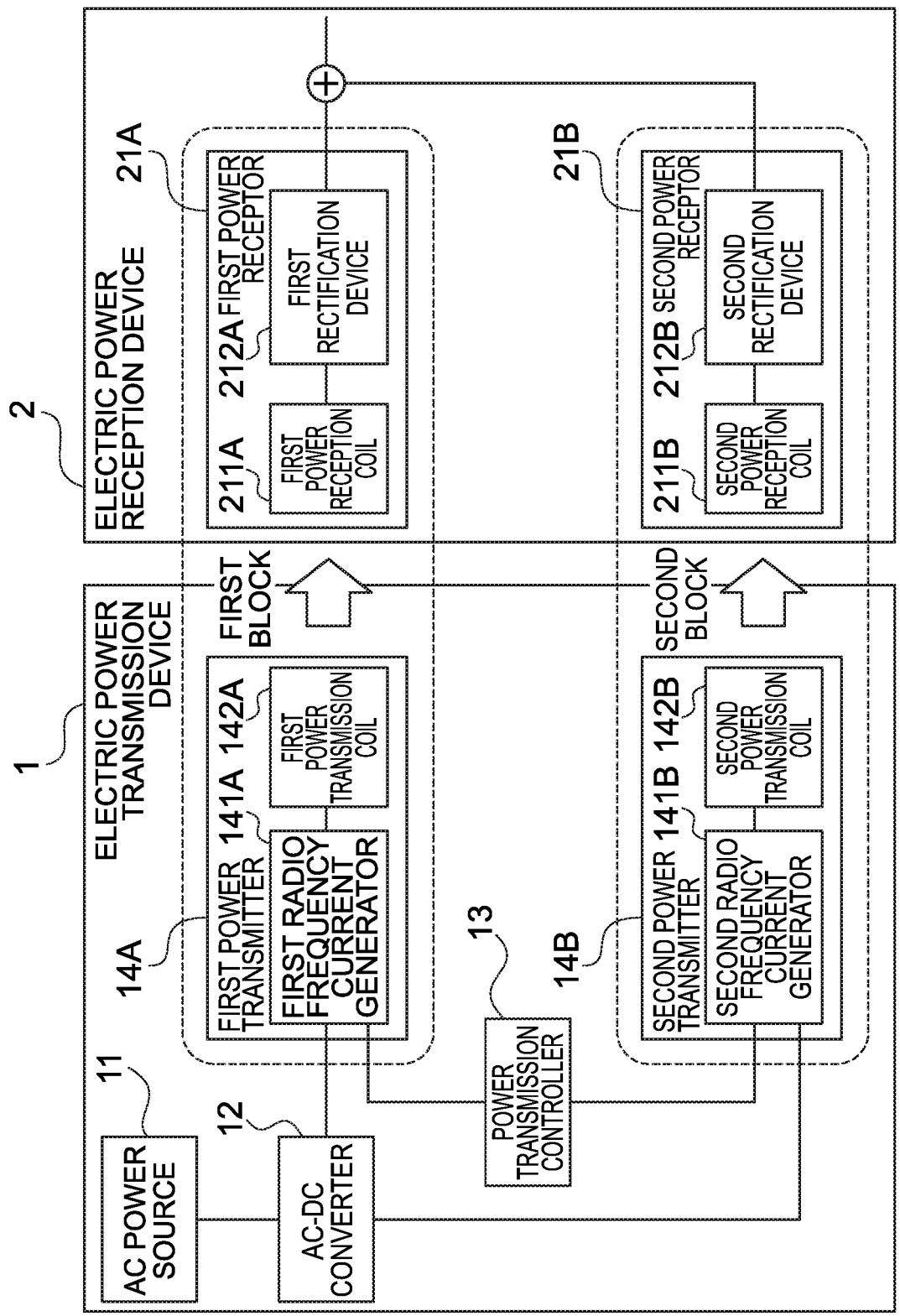
FIG. 1 is a block diagram illustrating an example of an electric power transmission system according to a first embodiment.

An embodiment of the present invention is to efficiently obtain a leakage magnetic field reduction effect while conducting both magnetic-magnetic field cancellation and frequency hopping in electric power transmission by a plurality of magnetic fields.

An electric power transmission device as an aspect of the present invention includes a plurality of power transmitters configured to respectively generate magnetic fields. Phases of the respective magnetic fields are set such that the respective magnetic fields cancel out each other. The power transmitters sequentially shift frequencies of the respective magnetic fields to the same value at the same timing. A shift width of each of the frequencies for one-time shifting is limited by an upper limit value.

Below, a description is given of embodiments of the present invention with reference to the drawings. The present invention is not limited to the embodiments. Incidentally, alphabet indexes for the number of the drawing are given to distinguish individual items of the same number.

First Embodiment

FIG. 1 is a block diagram illustrating an example of an electric power transmission system according to a first embodiment. The electric power transmission system according to the first embodiment includes an electric power transmission device 1 and an electric power reception device 2.

The electric power transmission device 1 includes an AC (alternating current) power source 11, an AC-DC (alternating current to direct current) converter 12, a power transmission controller 13, and two power transmitters 14. Each power transmitter 14 includes a radio frequency current generator 141 and a power transmission coil 142. Herein, the two power transmitters 14 are distinguished by being referred to as a first power transmitter 14A and a second power transmitter 14B. Components of the power transmitters 14 are also distinguished in the same manner.

The electric power reception device 2 includes two power receptors 21. Each power receptor 21 includes a power reception coil 211 and a rectification device 212. Herein, the two power receptors 21 are distinguished by being referred to as a first power receptor 21A and a second power receptor 21B. Components of the power receptors 21 are also distinguished in the same manner.

In the electric power transmission system of the present embodiment, power is transmitted from the electric power transmission device 1 to the electric power reception device 2 by using a magnetic field generated from a radio frequency current due to electromagnetic induction. That is, in the electric power transmission system of the present embodiment, power is supplied to the electric power reception device 2 in a contactless manner.

Further, in the present embodiment, at least two power transmission systems (power blocks) are provided in order to transmit as large power as possible while holding the intensity of the leakage magnetic field of the electric power transmission system within an acceptable value. Hereinafter, the power transmission system will be referred to simply as a block. In FIG. 1, the first power transmitter 14A and the first power receptor 21A structure a first block. The second power transmitter 14B and the second power receptor 21B structure a second block.

However, when the electric power transmission is performed without taking any measures, a part of the magnetic field interferes with peripheral equipment as a leakage magnetic field. Therefore, in the present embodiment, both magnetic-magnetic field cancellation by opposite phase process and spread spectrum process are used so as to reduce the leakage magnetic field.

The magnetic-magnetic field cancellation by the opposite phase process is a method for reducing the intensity of the leakage magnetic field by opposite phase process of the two corresponding magnetic fields. The opposite phase process can be performed by adjusting a direction or a phase of a radio frequency current that generates a magnetic field. When the phases of the magnetic fields are opposite to each other, the magnetic fields cancel out each other (in other words, when the phases of the magnetic fields are opposite to each other, the sum of vectors of the magnetic field becomes zero), a leakage magnetic field reduction effect (attenuation) of reducing the intensity of the leakage magnetic field is obtained. The leakage magnetic field reduction effect by the opposite phase process is called an opposite phase effect.

In the present embodiment, adjustment is performed such that a magnetic field generated by the first block and a magnetic field generated by the second block have phases opposite to each other. That is, two magnetic fields with mutually opposite phases are synthesized to reduce the leakage magnetic field, thereby preventing the influence on the other external equipment in the distance. An implementation method for the opposite phase process in the present embodiment will be described later.

The spread spectrum process means extending a frequency band (spreading) for use in electric power transmission. For example, by shifting a switching frequency in generation of a radio frequency current for generating a magnetic field, the spectrum (the frequency) of the radio frequency current is shifted. It is known that the frequency band to be used by the magnetic field is extended in this manner, and the intensity is reduced more than in the case of not shifting the frequency of the radio frequency current. Shifting the frequency of the magnetic field, namely the frequency of the radio frequency current, is called frequency hopping.

Figure 2A:
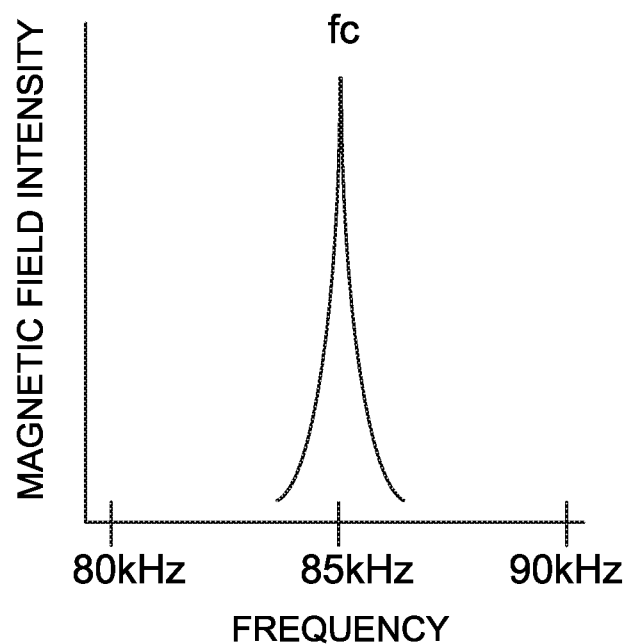
FIGS. 2A and 2B are graphs for explaining frequency hopping.
Figure 2B:
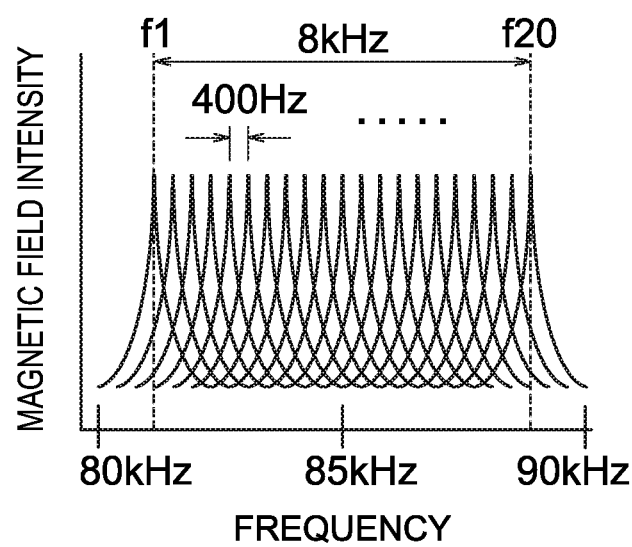

FIGS. 2A and 2B are graphs for explaining the frequency hopping. FIG. 2A is a graph illustrating the relationship between the frequency and the magnetic field intensity in the case of not performing the frequency hopping, namely, the case of performing the electric power transmission with only one frequency. In the example of FIG. 2A, it is assumed that the electric power transmission is being performed only in 85 kHz. Hence, a graph having one peak (whose the magnetic field intensities are high) at a point of 85 kHz is illustrated.

FIG. 2B is a graph illustrating the relationship between the frequency and the magnetic field intensity in the case of performing the frequency hopping, namely, the case of performing the electric power transmission with a plurality of frequencies. In the example of FIG. 2B, it is assumed that the electric power transmission is being performed in twenty frequencies with 85 kHz at the center. Hence, a graph having twenty peaks (whose the magnetic field intensities are high) is illustrated.

A value by which the frequency shifts in the case of performing the frequency hopping will hereinafter be referred to simply as a shift value. Numbers are provided in an ascending order of shift values. An i-th (i is an integer equal to or larger than 1) shift value is assumed to be represented as $f_i$. That is, a first shift value $f_1$ is the minimum shift value, $f_i$ is the i-th smallest shift value, and $f_{i+1} > f_i$ holds. Further, the number of the shift values will be referred to as a shift number. In the example of FIG. 2B, the shift number is 20.

In the frequency hopping, the frequency shifts from any shift value to any different shift value at some timing. The shifting is performed many times, and thereby the spread spectrum processes and the intensity of the leakage magnetic field decreases. In the examples of FIG. 2B, a range from the minimum shift value $f_1$ to the maximum shift value $f_{20}$ is about 8 kHz, and it can thus be said that the frequency has spread about 8 kHz. The range from the minimum shift value to the maximum shift value will be referred to as a spread bandwidth. Further, a difference in frequency for each time of change in frequency, namely a difference ($f_{i+1} - f_i$) between the frequency before the change and the frequency after the change will be referred to as a shift width.

Power in the case of performing such frequency hopping is the same as power in the case of not performing the frequency hopping on a long-term basis. Therefore, power per frequency (power density) is smaller in the case of performing the frequency hopping than in the case of not performing the frequency hopping. By performing the frequency hopping, the power energy spreads with a plurality of frequencies to reduce the power density measured as the leakage magnetic field. The effect of reduction in leakage magnetic field (leakage magnetic field reduction effect) by the frequency hopping will be referred to as a spread spectrum effect.

In the present embodiment, the spread spectrum effect is obtained by the frequency hopping, namely, by sequential shifting of the frequency of the radio frequency current at fixed time intervals. An implementation method for the frequency hopping in the present embodiment will be described later.

However, each block in the electric power transmission system has different transient response characteristics. Due to the difference of the transient response characteristics, a different transient response occurs in each block at the time of the frequency shifting. Therefore, even when both the magnetic-magnetic field cancellation by the opposite phase process and the frequency hopping are used simultaneously, by merely combining both methods, the leakage magnetic field reduction effect may decrease more significantly than assumed.

For example, even when the components of each block are the same, there are component variations in constituent devices of the components, and Hence, each block does not have the same characteristics. Further, even if the characteristics of each block can be made the same, the characteristics of each block change caused by positions of the electric power transmission device 1 and the electric power reception device 2, or the like. For example, in a case where an electric vehicle mounted with the electric power reception device 2 is parked in a parking lot provided with the electric power transmission device 1, when the electric vehicle is parked slightly obliquely to a predetermined parking position, coupling states of the blocks are respectively different from ideal states, leading to a change in circuit response characteristics and the like of each block. It is thus difficult to make the transient response characteristics of each block the same.

In the frequency hopping, it is not that the frequency shifts instantly without delay. Therefore, in the transient period of the frequency, the difference in phase of the radio frequency current between each block changes due to the difference in transient response characteristics. With the opposite phase not sustained in that period, the opposite phase effect disappears. Thus, the opposite phase effect decreases due to the transient response of each power transmitter 14 at the time when the frequency is changed. Hence, the magnetic field intensity becomes higher than assumed.

Therefore, in the present embodiment, a limit is imposed on the frequency hopping so as to reduce the decrease in the leakage magnetic field reduction effect. That limit prevents a situation in which the leakage magnetic field reduction effect decreases more significantly than assumed, namely the intensity of the leakage magnetic field is significantly higher than assumed, at the time when both the opposite phase process and the frequency hopping are implemented. Specifically, the shift width is limited by an upper limit value for the shift width. This holds the length of the period in which the opposite phase effect disappears, to hold the decrease in the leakage magnetic field reduction effect in an acceptable range. That is, the magnetic field intensity of the leakage magnetic field decreases.

The inner configuration of the electric power transmission device 1 will be described.

The AC power source 11 supplies an AC current to the AC-DC converter 12. The AC power source 11 may be a three-phase power source or a single-phase power source. A power factor correction circuit, a rectifier, and the like may be connected to the AC power source 11. The AC-DC converter 12 converts the supplied AC current to a DC current. The DC current is then transmitted from the AC-DC converter 12 to the first power transmitter 14A and the second power transmitter 14B.

The power transmission controller 13 controls the power transmitter 14 such that the opposite phase process and the frequency hopping are performed. How to perform the control may be set as appropriate.

For example, the phase of the magnetic field may be controlled by, for example, supplying an opposite phase control signal as a drive signal. Thereby, the phase of the magnetic field generated by each power transmitter 14 is opposite.

When a set value (parameter) regarding the magnetic field is fixed, the power transmitter 14 may be enabled to generate the magnetic field in advance by using the set value. In that case, the power transmission controller 13 does not need to perform control on the phases. For example, when the phase of the magnetic field generated by the first power transmitter 14A is fixed to 0 degree and the phase of the magnetic field generated by the second power transmitter 14B is fixed to 180 degree, the power transmission controller 13 does not perform control on the phases.

Further, the timing for the frequency shifting may be specified by the power transmission controller 13 transmitting a clock signal as it is to each power transmitter 14. Alternatively, the timing for the frequency shifting may be specified by dividing a clock signal to generate a signal for operating an inverter 1412 in the power transmitter 14, described later. The shift value may be transmitted in advance to the power transmitter 14 or may be transmitted each time the shifting is performed. It is thereby possible to sequentially change the frequency of each magnetic field generated by each power transmitter 14 to the same value at the same timing.

It is assumed that the shift value and the shift number are set in advance in the power transmission controller 13. For example, as in the example of FIG. 2B, it is assumed that 20 shift values (candidate values) from $f_1$ to $f_{20}$ are registered in the power transmission controller 13. In that case, the power transmission controller 13 selects one frequency from the twenty shift values on the basis of a predetermined rule and controls each power transmitter 14 such that the frequency becomes the selected frequency.

For example, in the case of shifting the frequency in the triangular waveform or the sine waveform, the power transmission controller 13 may sequentially determine the value of the frequency to be shifted from the registered 20 candidate values in an ascending order or a descending order, and after determining $f_1$ or $f_{20}$ which is the terminal candidate value, the power transmission controller 13 may sequentially determine the value of the frequency in the opposite order to the previous.

However, the specified shift value is caused to satisfy the limit set by the upper limit value for the shift width. The decrease in the opposite phase effect depends on an absolute value of the difference between transient responses of power transmitters 14. The transient response at the time of the frequency shifting is almost proportional to the shift width of the frequency. Hence, the difference between transient responses of power transmitters 14 is also proportional to the shift width of the frequency. Therefore, limiting the shift width by the upper limit value can reduce the decrease in the opposite phase effect. Then, the power transmission controller 13 determines such a shift value as to satisfy the limit on the shift width set by the upper limit value and controls the power transmitter 14 such that the shift value becomes the determined shift value. The limit on the shift width set by the upper limit value will be referred to as a shift width limit. Incidentally, the shift width limit is assumed to be that the shift width is equal to or smaller than the upper limit value or that the shift width is smaller than the upper limit value. That is, when the shift width is the same as the upper limit value, the shift width limit may be assumed to be satisfied or may be assumed not to be satisfied.

The upper limit value is determined by estimating the difference in transient response. For example, it is considered that the maximum value of the difference in transient response is estimated on the basis of the worst value in a component variation distribution. The worst value in the component variation distribution may be set by component simulation or the like which is performed considering the components.

Figure 3:
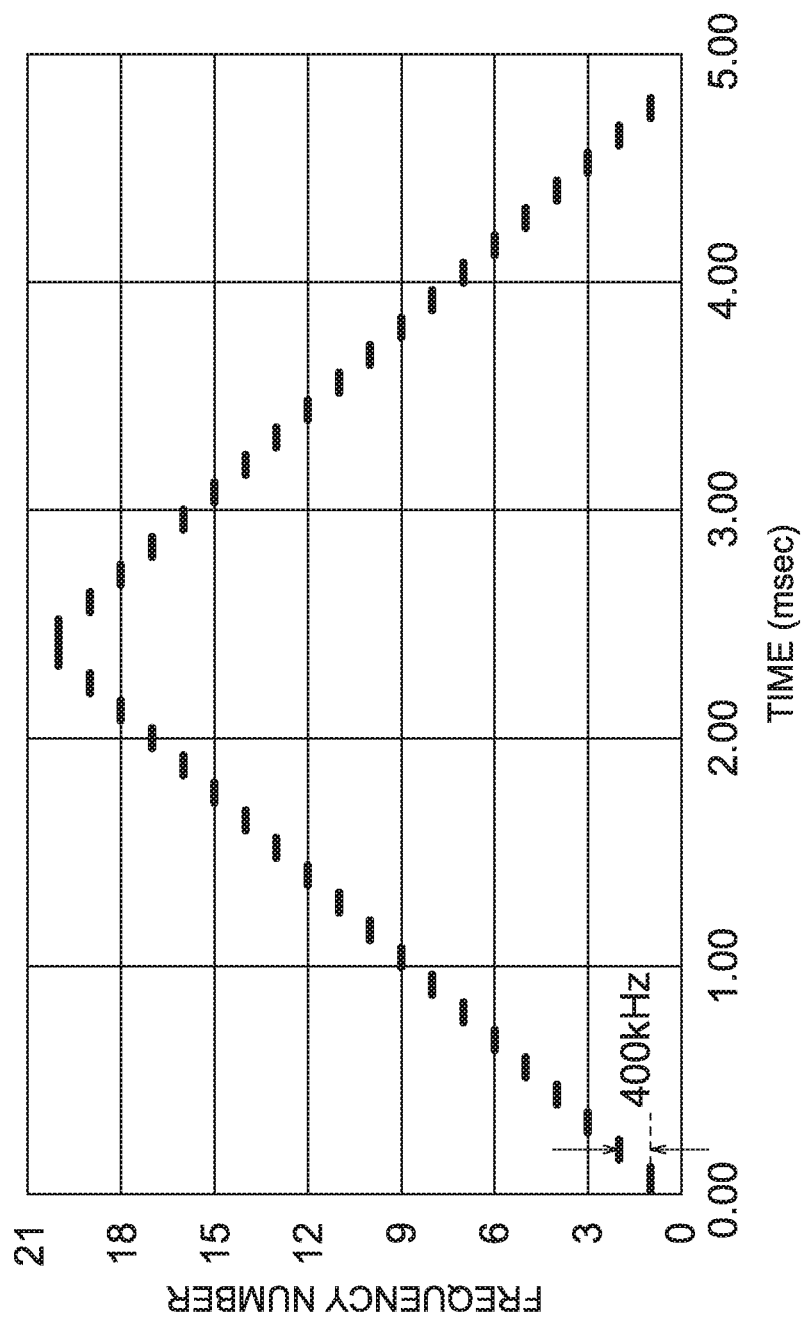
FIG. 3 is a graph illustrating an example of frequency shifting when a shift width limit is satisfied.

FIG. 3 is a graph illustrating an example of the frequency shifting when the shift width limit is satisfied. As in the example of FIG. 2B, it is assumed that 20 shift values from $f_1$ to $f_{20}$ are registered in the power transmission controller 13 and that an interval between adjacent shift values is fixed to be 400 Hz. Further, it is assumed to be set as the shift width limit that the shift width becomes smaller than 800 Hz. FIG. 3 illustrates an example of the frequency shifting in the case of controlling the power transmission controller 13 so as to satisfy the shift width limit in the above assumption. In FIG. 3, the horizontal axis represents the time, and the vertical axis represents the shift value number.

With the interval of the shift values being 400 Hz, when the frequency shifts to the adjacent shift value, the shift width limit is satisfied. Therefore, in the example of FIG. 3, the power transmission controller 13 performs control such that the frequency first shifts in the ascending order (sequentially from $f_1$ toward $f_{20}$) and then shifts in the descending order (sequentially from $f_{20}$ toward $f_1$).

Incidentally, the shift value at the start of the frequency hopping may be any shift value. The shifting may be performed first in the descending order or may be performed first in the ascending order. For example, the frequency hopping may be started with the shift value $f_5$ and may then shift to $f_6$ or shift to $f_4$.

When the frequency first shifts in the ascending order or the descending order and then shifts in the opposite order, the form of the graph becomes a triangular form, and such a shifting status is defined as "shifting in a triangular waveform." Incidentally, the shifting form is not limited to the triangular waveform.

Incidentally, the sustained time for the shift value from one shifting to the next may be set as appropriate in accordance with a request specification. Further, the sustained time may be different for each shift value. In FIG. 3, the sustained time for each shift value is 125 μsec except for the shift value $f_{20}$, and the sustained time for the shift value $f_{20}$ is 250 μsec. This is achieved by performing control so as to make the sustained time twice only for the shift value $f_{20}$. Alternatively, this may be achieved such that the sustained time for the shift value is fixed to 125 μsec and the power transmission controller 13 performs control so as to shift the frequency in the order of $f_{18}$, $f_{19}$, $f_{20}$, $f_{20}$, and $f_{19}$.

Figure 4:
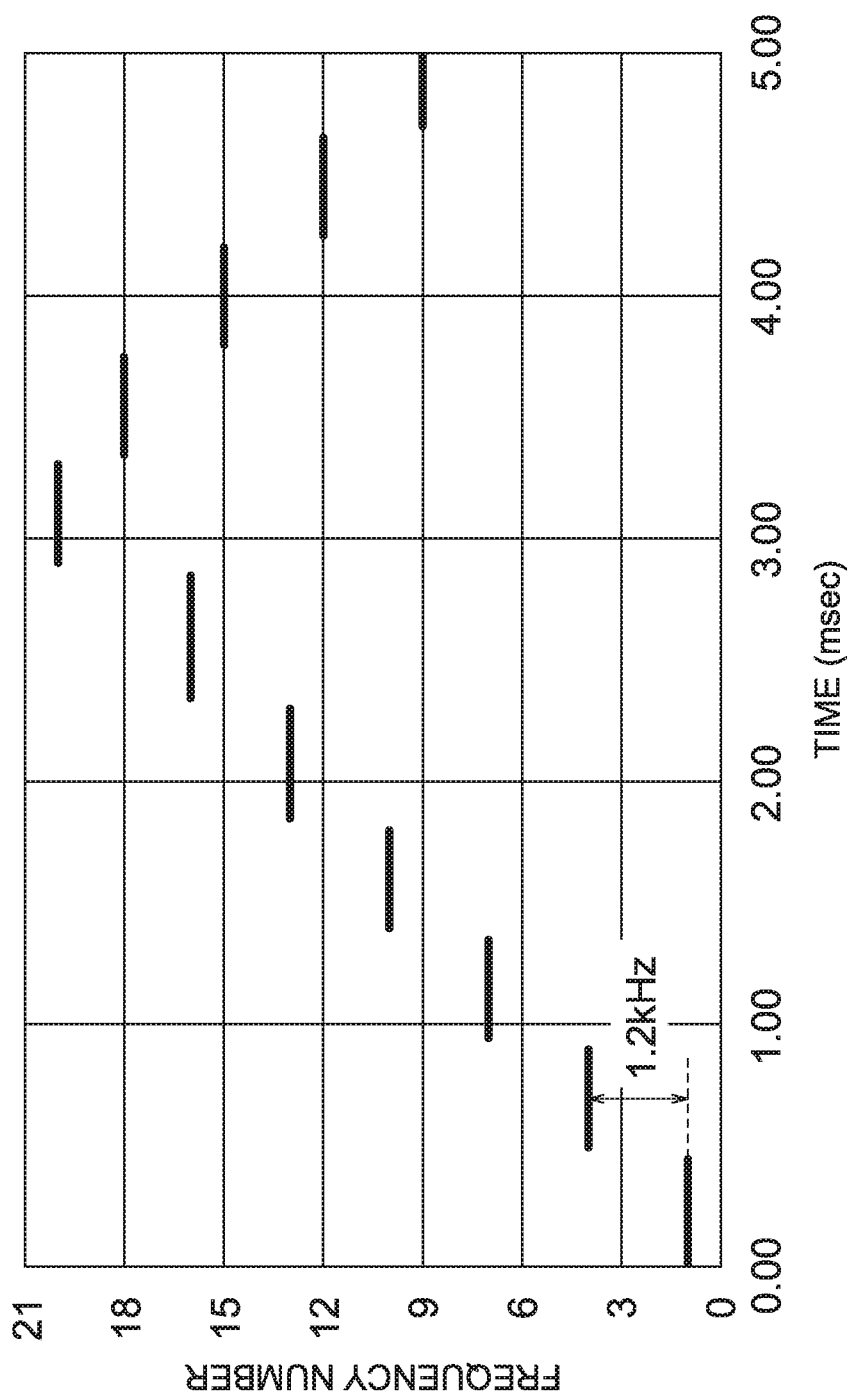
FIG. 4 is a graph illustrating an example of the frequency shifting when the shift width limit is not satisfied.

FIG. 4 is a graph illustrating an example of the frequency shifting when the shift width limit is not satisfied. In the same assumption as the assumption in FIG. 3, the power transmission controller 13 shifts the frequency first in the ascending order and then in the descending order in the same manner as in the example of FIG. 3. However, differently from the example of FIG. 3, the control is performed so as to shift the frequency to every three shift values. That is, the frequency is shifted to the shift values in the order of $f_1$, $f_4$, $f_7$, and $f_{10}$. Incidentally, next to the shift value $f_{19}$, the shift value $f_{20}$ and the shift value $f_{19}$ are skipped, and the frequency is shifted to the shift value $f_{18}$. In this case, the frequency width for one-time shifting is 1.2 kHz. Thus, in the example of FIG. 4, the shift width limit is not satisfied.

Figure 5A:
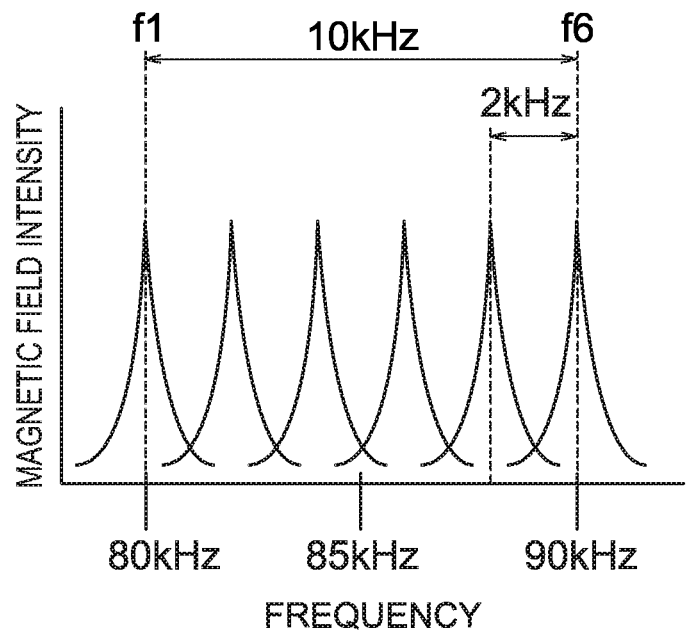
FIGS. 5A and 5B are graphs illustrating another example of the frequency shift when the shift width limit is not satisfied.
Figure 5B:
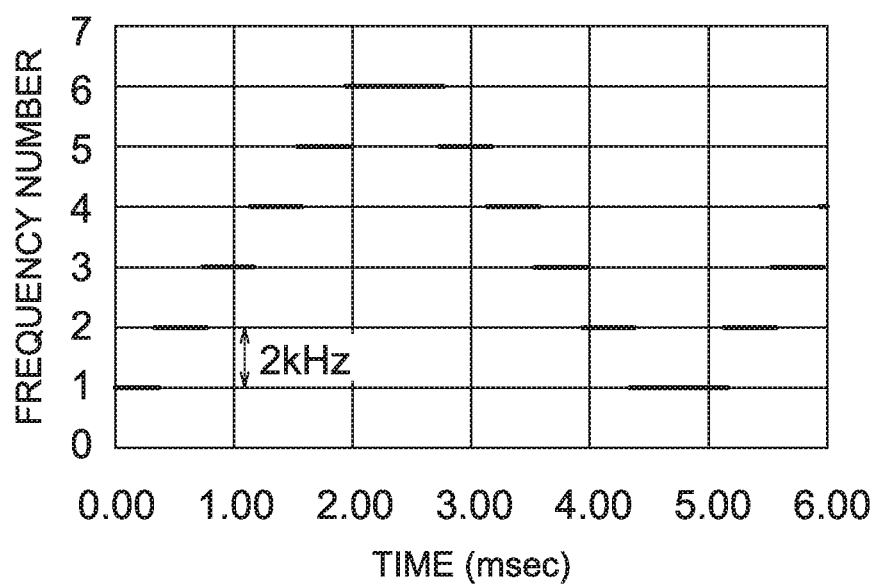

FIGS. 5A and 5B are graphs illustrating another example of the frequency shift when the shift width limit is not satisfied. In the example of FIGS. 5A and 5B, differently from the assumptions of FIGS. 3 and 4, six shift values $f_1$ to $f_6$ are assumed to be registered in the power transmission controller 13 as illustrated in FIG. 5A. The interval between the adjacent shift values is assumed to be fixed to 2 kHz. Further, as in the assumptions thus far, the shift width limit is assumed to be set such that the shift width becomes smaller than 800 Hz.

In this assumption, even when the power transmission controller 13 performs control such that the shift values are adjacent to each other, the shift width cannot satisfy the shift width limit as illustrated in FIG. 5B. Therefore, the registered shift value needs to be changed.

Thus, even when the shift values have been set, the shift width limit is not necessarily satisfied depending on how to make the shifting. Further, it could be that the shift width limit is not satisfied by using the set shift value. Therefore, the power transmission controller 13 performs control such that the shift width limit is satisfied.

For example, the power transmission controller 13 may confirm whether the previously registered shift value and a shift rule satisfy the shift width limit, and only when the shift width limit is satisfied, the power transmission controller 13 may control the power transmitter 14 on the basis of the shift value and the shift rule. Alternatively, the power transmission controller 13 may generate such a shift rule as to satisfy the shift width limit by using the previously registered shift value.

Alternatively, the power transmission controller 13 may determine such a shift value as to satisfy the shift width limit. For example, when an available frequency band is specified, the power transmission controller 13 may determine a shift value that satisfies the shift width limit within the available frequency band.

It is also considered that a margin is provided at each end of the frequency band so as to prevent the influence of a frequency side lobe. Hence, the power transmission controller 13 may determine the shift value not in the entire available frequency band but in a range with the margin excluded from the available frequency band. For example, when an available frequency band of 80 kHz to 90 kHz is specified, the shift value may be set using the entire frequency band of 80 kHz to 90 kHz, or may be set between 81 kHz to 89 kHz to set a margin of about 1 kHz at each end of the frequency band.

When the shift width limit cannot be satisfied, the power transmission controller 13 may control the power transmitter 14 so as not to transmit power. Alternatively, the power transmission controller 13 may output a signal indicating an error via an output device (not illustrated). When a set value newly input into the power transmission controller 13 cannot satisfy the shift width limit, the power transmission controller 13 may use the set value having been used thus far.

When the shifting in the triangular waveform as in FIG. 3 is cyclically repeated by control of the power transmission controller 13, the spread spectrum effect can be obtained stably. Therefore, in order to cyclically shift the frequency, the power transmission controller 13 may preferably perform control so as to repeatedly shift the frequency to the same shift value in a fixed cycle.

Figure 6:
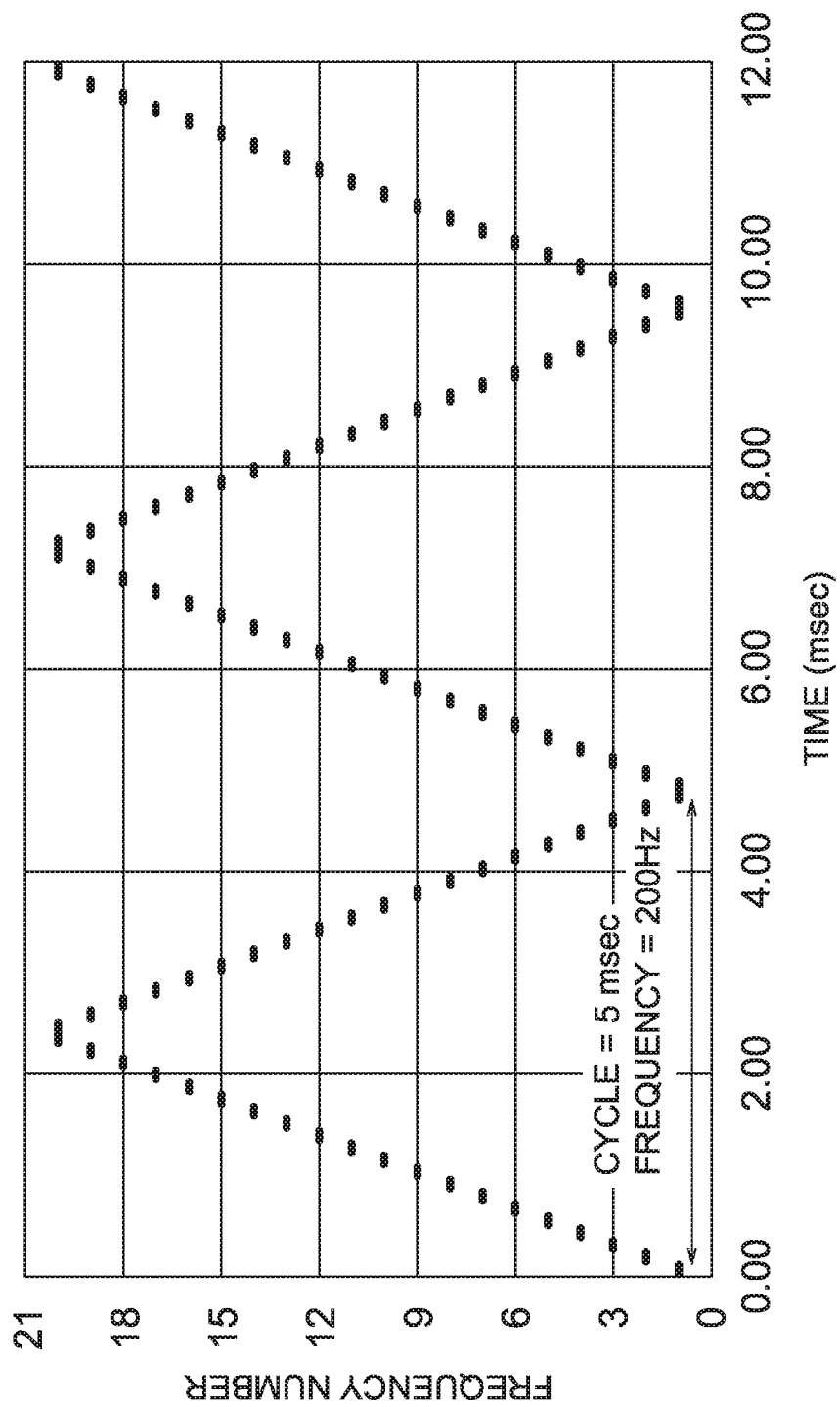
FIG. 6 is a graph illustrating an example of cyclic shifting.
Figure 7:
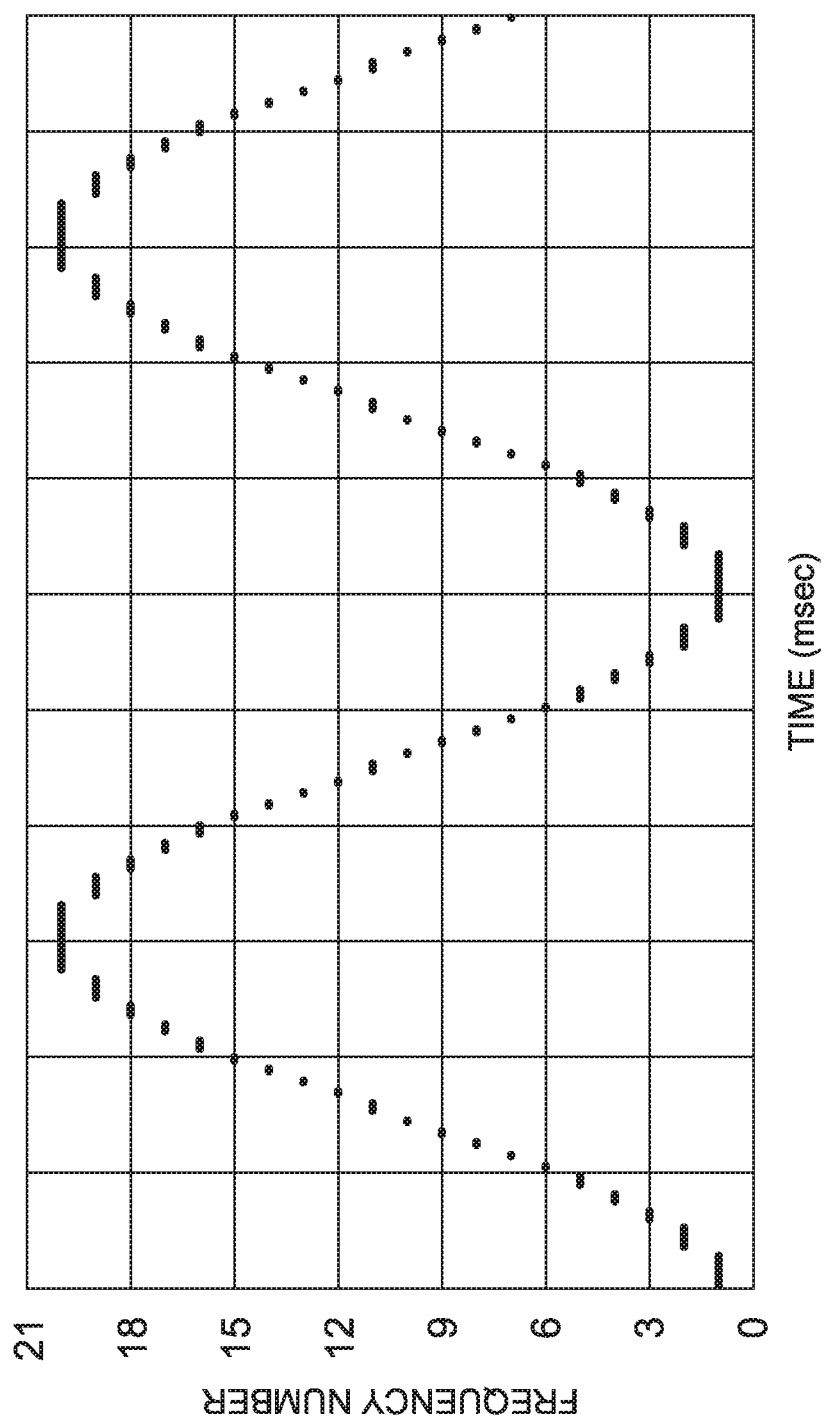
FIG. 7 is a graph illustrating another example of the cyclic shifting.

FIG. 6 is a graph illustrating an example of cyclic shifting. In FIG. 6, the shifting in the triangular waveform illustrated in FIG. 3 is repeated. This can be achieved by performing control so as to cyclically repeat the shifting in the descending order and the ascending order. FIG. 7 is a graph illustrating another example of the cyclic shifting. FIG. 7 illustrates the graph in the sine waveform. When the sustained time at each of specific shift values is made longer than at the other shift values in the shifting in the descending order and the ascending order, the shifting is performed in such a sine waveform. Alternatively, when a specific shift value is successively defined in a case where the frequency hopping is being performed on the basis of a shift rule defining the order of shifting, the shifting is performed in such a sine waveform. For example, when the order of shifting is defined as being $f_{19}$, $f_{20}$, $f_{20}$, $f_{19}$ in the shift rule, $f_{20}$ is sustained twice as long as the other frequencies. Thus, the shifting may be performed in the sine waveform.

In the cyclic shifting as in FIGS. 6 and 7, one cycle is from the start point to the end point, the start point being at which the frequency shifts from the shift value $f_{k+1}$ or $f_{k-1}$ to the shift value $f_k$, and the end point being at which the frequency again shifts from the same shift value $f_{k+1}$ or $f_{k-1}$ to the shift value $f_k$. An example of one cycle is from the time at which the frequency shifts from the shift value $f_{11}$ to the shift value $f_{12}$ to the time at which the frequency again shifts from the shift value $f_{11}$ to the shift value $f_{12}$. That cycle will hereinafter be referred to as a frequency hopping cycle.

The power transmitter 14 generates a magnetic field with a desired phase and a desired frequency by control of the power transmission controller 13. Specifically, the radio frequency current generator 141 generates a radio frequency signal with a specified frequency and a specified phase. The power transmission coil 142 then generates a magnetic field by the radio frequency current flowing therethrough. That is, the frequency and the phase of the radio frequency current are the same as the frequency and the phase of the magnetic field.

Figure 8:
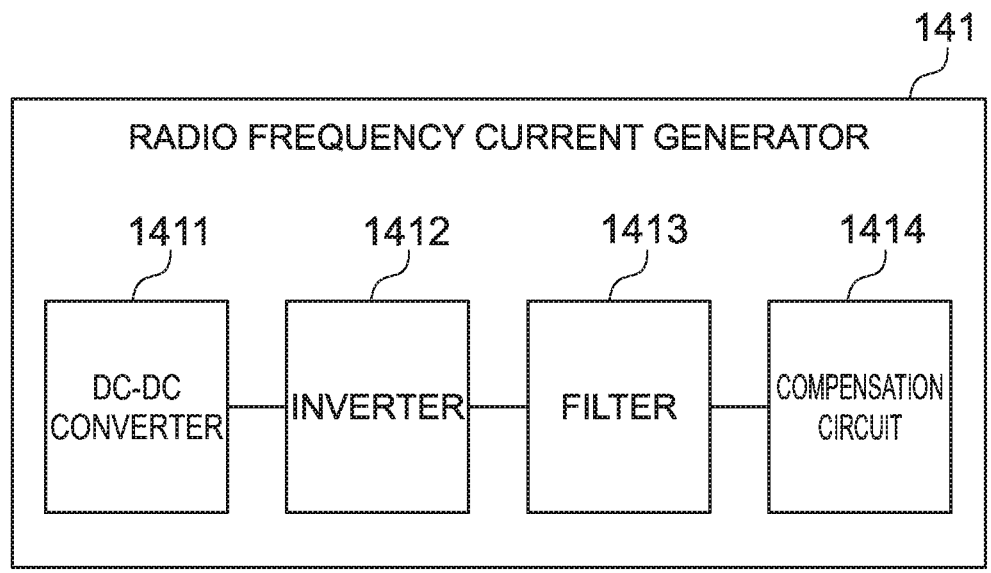
FIG. 8 is a diagram illustrating an example of an inner configuration of a radio frequency current generator.

The radio frequency current generator 141 may be achieved in a circuit. The radio frequency current generator 141 may include, for example, an inverter, a rectifier, a power factor correction circuit (PFC), a voltage conversion circuit, and the like. FIG. 8 is a diagram illustrating an example of the inner configuration of the radio frequency current generator 141. The radio frequency current generator 141 in FIG. 8 includes a DC-DC converter 1411, an inverter 1412, a filter 1413, and a compensation circuit 1414. Incidentally, the configuration of the radio frequency current generator 141 is not limited to the example of FIG. 8.

The DC-DC converter 1411 controls (boosts or drops) an input DC current to a desired voltage. The voltage value is controlled in this manner to adjust an amount of power transmitted to the electric power reception device 2.

The inverter 1412 converts the input DC current to an AC current with the specified frequency and phase at the specified timing. Accordingly, the generation of the radio frequency current and the frequency hopping are performed. In order to make the frequency of each radio frequency current the same, the switching operation of each inverter 1412 may be synchronized.

The filter 1413 suppresses an unnecessary harmonic wave of the radio frequency current output from the inverter 1412.

The compensation circuit 1414 compensates the radio frequency current for the purpose such as improving a power factor and reducing a phase difference between the radio frequency current and the voltage before the radio frequency current is transmitted to the power transmission coil 142. The compensation circuit 1414 is made up of a capacitor, for example. The capacitor may be connected in series to the power transmission coil 142 or may be connected in parallel thereto. The radio frequency current generated and adjusted thus is transmitted to the power transmission coil 142.

The power transmission coil 142 generates the magnetic field by the radio frequency current flowing therethrough. When the magnetic field generated from the power transmission coil 142 reaches the power reception coil 211 in the same block, mutual coupling occurs between the power transmission coil 142 and the power reception coil 211. Thereby, each power reception coil 211 receives power from the power transmission coil 142 in the same block. In this manner, the power is transmitted in a contactless manner. Herein, the magnetic field generated from a second power transmission coil 142B has an opposite phase to the phase of the magnetic field generated from a first power transmission coil 142A.

As types of coils, there are a solenoid type and a spiral type which are classified on the basis of placement of a winding and a ferrite core, but either type may be used. The first power transmission coil 142A and the second power transmission coil 142B may be different types.

Thus, the electric power transmission device 1 can transmit power to the electric power reception device 2 while reducing the decrease in the leakage magnetic field reduction effect.

The electric power reception device 2 receives power generated in the two power reception coils 211 due to mutual induction. The type of the power reception coil 211 may be either type similar to the power transmission coil 142. A first power reception coil 211A and a second power reception coil 211B may be different types.

Figure 9:
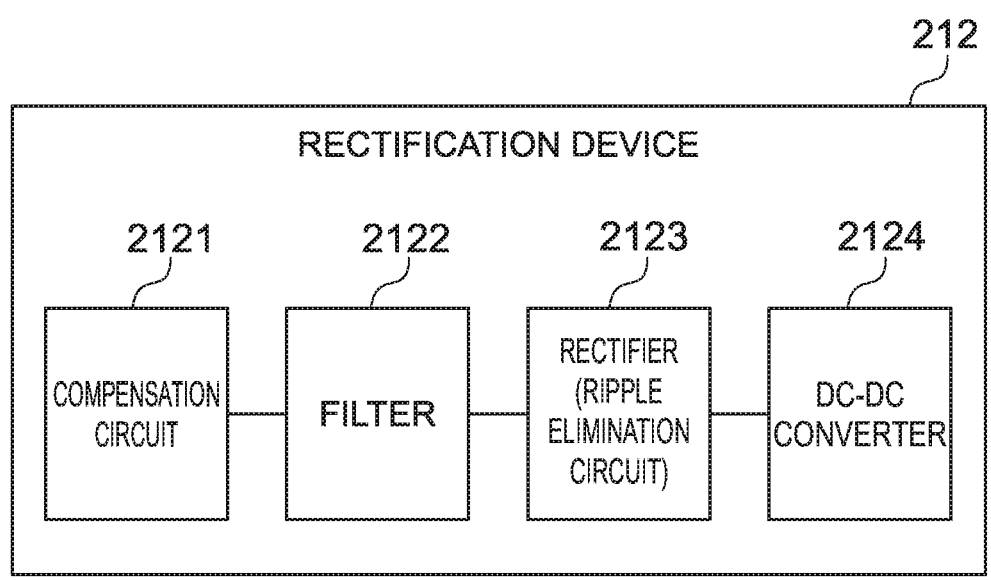
FIG. 9 is a diagram illustrating an example of a configuration of a rectification device.

Each rectification device 212 serves to rectify the radio frequency current from the power reception coil 211 and allow the rectified current to flow through a battery, another device, and the like. FIG. 9 is a diagram illustrating an example of the configuration of the rectification device 212. The rectification device 212 includes a compensation circuit 2121, a filter 2122, a rectifier (ripple elimination circuit) 2123, and a DC-DC converter 2124. Incidentally, the configuration of the rectification device 212 may only be able to rectify the radio frequency current and is not limited to the example of FIG. 9.

The radio frequency current from the power reception coil 211 is transmitted to the rectifier 2123 via the compensation circuit 2121 and the filter 2122. The compensation circuit 2121 may also be made up of a capacitor or the like, and the capacitor may be connected in series to the power reception coil 211 or may be connected in parallel thereto. The filter 2122 may also be made up of a capacitor, an inductor, or a combination of these. The filter 2122 may not be provided when the magnetic field intensity to electromagnetic interference is sufficiently low with respect to an acceptable value.

The rectifier 2123 may be made up of, for example, a full-bridge diode or the like. A current after the rectification contains many ripple components. Thus, the rectifier 2123 may include a ripple elimination circuit made up of a capacitor, an inductor, or a combination of these, so as to eliminate ripples. The DC-DC converter 2124 performs voltage conversion after rectification of the rectifier 2123.

Each current subjected to rectification, transformation and the like by each rectification device 212 is synthesized and transmitted to another component such as the battery. The electric power reception device 2 can receive the power thus.

As described above, the electric power transmission device 1 of the present embodiment performs both the opposite phase process and the frequency hopping, but the limit is imposed on the shift width of the frequency hopping by the upper limit value. It is thereby possible to hold in the acceptable range the decrease in the leakage magnetic field reduction effect by the magnetic-magnetic field cancellation due to the transient response at the time of the frequency hopping.

Second Embodiment

Figure 10:
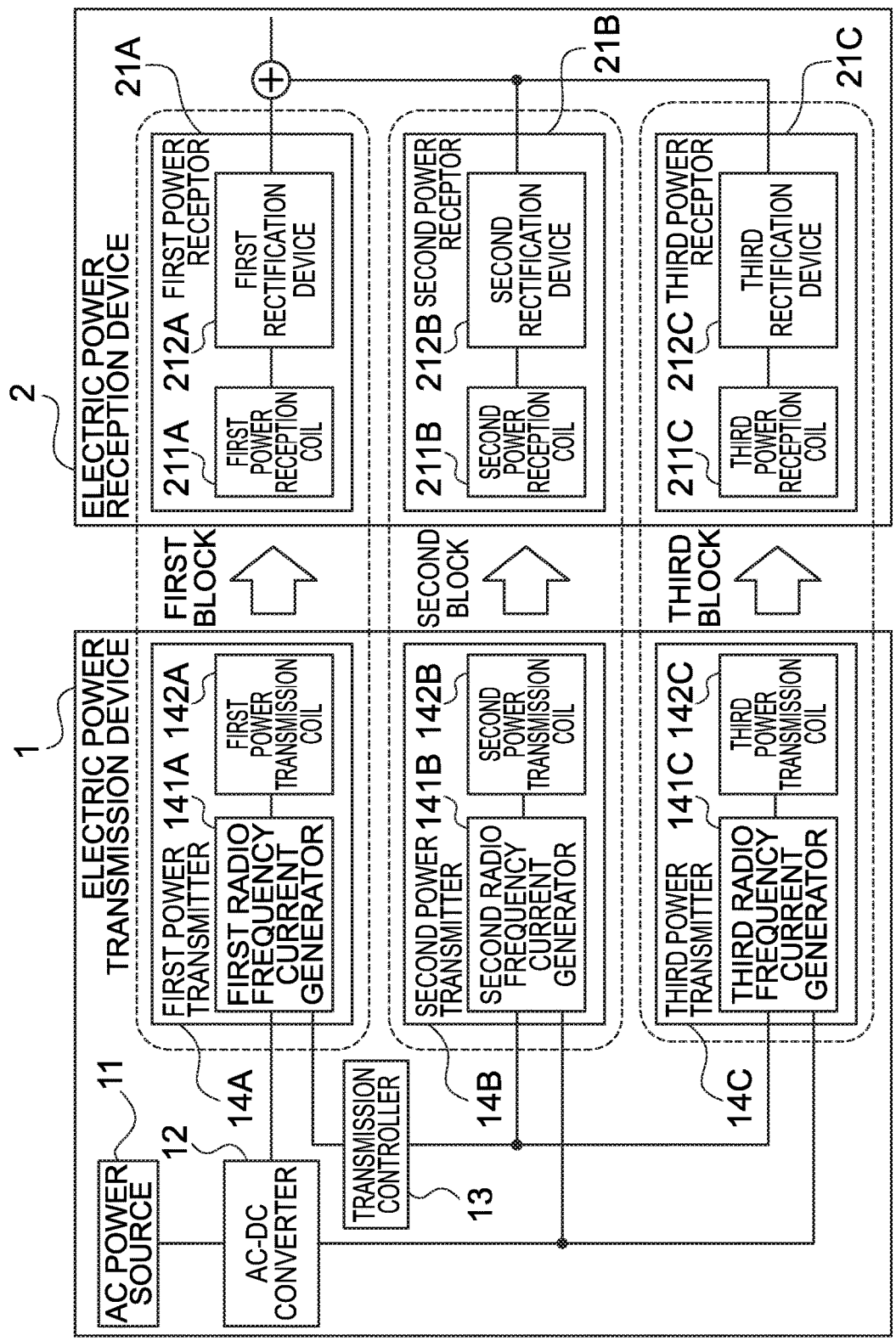
FIG. 10 is a block diagram illustrating an example of an electric power transmission system according to a second embodiment.

For convenience of description, it has been assumed that the two blocks are provided in the first embodiment. However, three or more blocks may be provided. Thus, as a second embodiment, the case of providing three or more blocks is shown FIG. 10 is a block diagram illustrating an example of an electric power transmission system according to a second embodiment. This is different from the first embodiment in that the number of power transmitters 14 and the number of the power receptors 21 are three or larger.

In the first embodiment, the opposite phase effect has been obtained by generating magnetic fields with opposite phases in the two blocks. In the case of the three or more blocks, the phases of the magnetic fields are not adjusted to be opposite but adjusted in accordance with the number of blocks, to cancel the magnetic fields. For example, in the case of cancellation of the magnetic fields in k blocks, the phase of each magnetic field is changed 360/k degrees. In the case of providing the three block, when each phase is changed 120 degrees, each magnetic field is canceled (because the sum of vectors of the magnetic fields becomes zero), and the leakage magnetic field reduction effect can thus be obtained.

Alternatively, the blocks may be divided into a plurality of groups and magnetic fields may be made to cancel out each other among the blocks in each group. For example, when there are five blocks, the blocks are divided into a group to include two blocks and a group to include three blocks. Then, in the group including the two blocks, the magnetic fields may be canceled by the opposite phase process, and in the group including the three blocks, the magnetic fields may be cancelled by changing each phase 120 degrees.

As in the first embodiment, the phase of each block may be adjusted by control of the power transmission controller 13 or may be fixed. The present embodiment is similar to the first embodiment except that the leakage magnetic field reduction effect is obtained by cancelling the magnetic fields in such a manner as above.

As described above, according to the second embodiment, even when the three or more blocks are provided, the leakage magnetic field reduction effect can be obtained. Therefore, even when three or more blocks are provided, it is possible to hold in the acceptable range the decrease in the leakage magnetic field reduction effect by the magnetic field cancellation due to the transient response at the time of the frequency hopping.

Third Embodiment

In the embodiments thus far, the shift width is limited to reduce the decrease in the leakage magnetic field reduction effect. However, it is considered that when the decrease in the leakage magnetic field reduction effect is an acceptable degree, there is no need to limit the shift width. Therefore, such an operation is considered where the shift width is limited when the degree of decrease in the leakage magnetic field reduction effect is assumed to be equal to or larger than a predetermined value.

Figure 11:
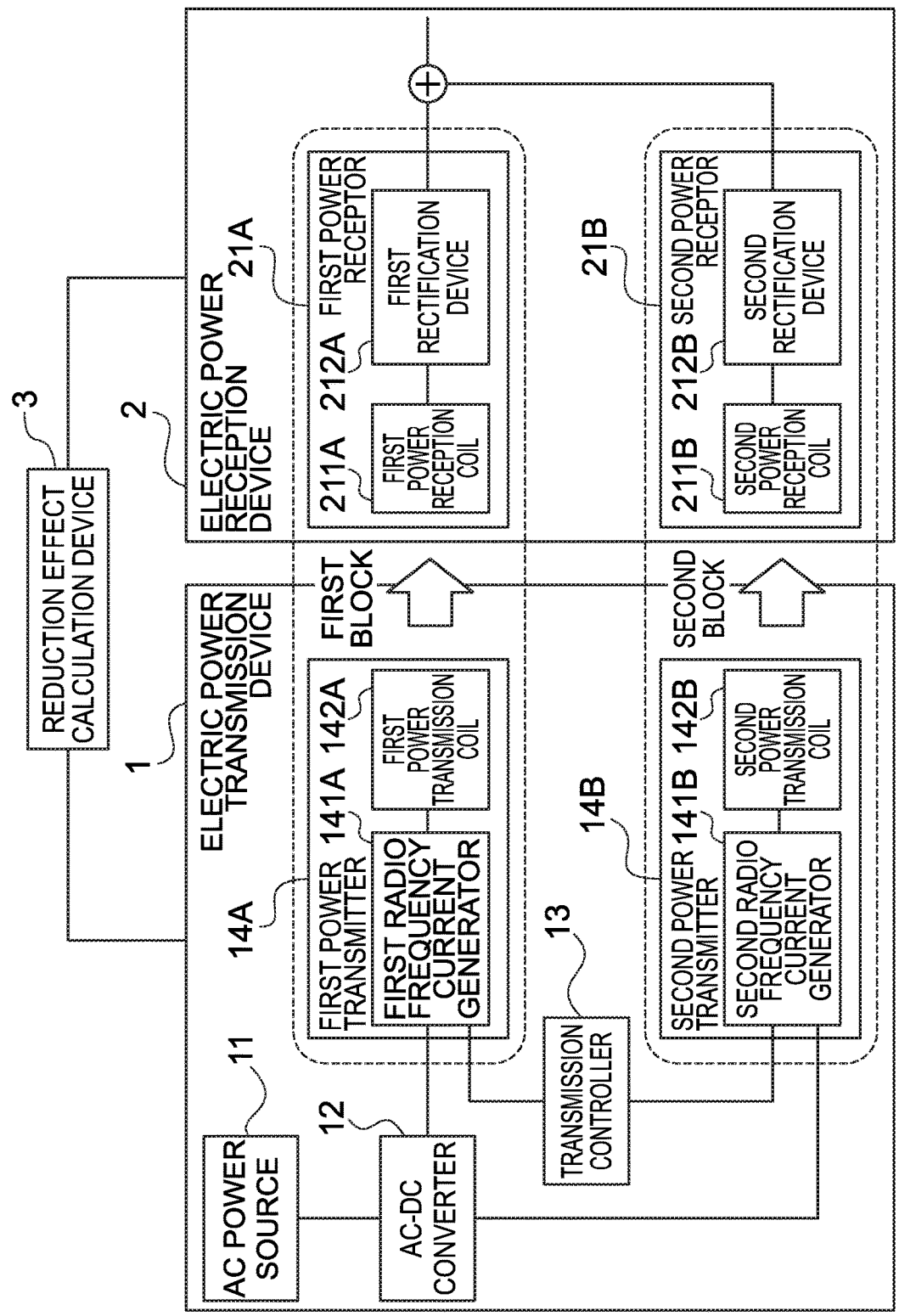
FIG. 11 is a block diagram illustrating an example of an electric power transmission system according to a third embodiment.

FIG. 11 is a block diagram illustrating an example of an electric power transmission system according to a third embodiment. The third embodiment is different from the embodiments thus far that the electric power transmission system further includes a reduction effect calculation device 3 for calculating a leakage magnetic field reduction effect. The reduction effect calculation device 3 is assumed to be a device capable of estimating the leakage magnetic field reduction effect by the opposite phase process, or some other device. The reduction effect calculation device 3 may be on the power transmission side or on the power reception side. The connection between the reduction effect calculation device 3 and each of the power transmission side and the power reception side is indicated by a solid line. However, the connection may be wired connection, or the connection may be through a wireless link to transmit data.

A description will be given using the terms "opposite phase process" and "opposite phase effect" for convenience of description, but in the case of providing three or more blocks, those terms will be referred to as "cancellation by magnetic fields" and "cancellation effect by magnetic fields".

In the contactless power supplying block, it is possible to measure a current that is supplied to each power transmission coil 142 and each reception coil 211. It is also possible to measure a transient response with an oscilloscope or the like at the time of shifting the frequency. Therefore, by mounting an ammeter, an oscilloscope, or the like in the reduction effect calculation device 3 and measuring the radio frequency current and the like at the time of transient response, it is possible to calculate the decrease in the leakage magnetic field reduction effect on the basis of the measured value.

Alternatively, the reduction effect calculation device 3 may calculate the leakage magnetic field reduction effect by using assumed data instead of using actual measurement data concerning electric power transmission.

The reduction effect calculation device 3 measures the opposite phase effect in the case of not performing the frequency hopping. Further, the reduction effect calculation device 3 measures the spread spectrum effect during the frequency hopping. At this time, the frequency hopping may not be performed by using all shift values, but the frequency hopping may be performed by using only two shift values which are the minimum shift value $f_{min}$ and the maximum shift value $f_{max}$. The spread spectrum effect in that frequency hopping is measured. The difference in frequency between the minimum shift value $f_{min}$ and the maximum shift value $f_{max}$ will be referred to as the maximum shift width. The frequency hopping performed using the two shift values which are the minimum shift value $f_{min}$ and the maximum shift value $f_{max}$ will be referred to as the maximum shift width frequency hopping. Further, both the opposite phase process and the frequency hopping or the maximum shift width frequency hopping are performed to measure the leakage magnetic field reduction effect.

At the time of performing the above measurement, it is notified to the power transmission controller 13 that the measurement will be performed, and the power transmission controller 13 may control the power transmitter 14 so as to obtain the phase and frequency for the measurement. That is, the power transmission controller 13 conducts: the first test only performing cancellation of the magnetic fields without performing the frequency shifting; the second test only performing the frequency shifting without performing the cancellation of the magnetic fields; and a third test performing both cancellation of the magnetic fields and performing the frequency shifting. Incidentally, the third test may not be a test but may be normal electric power transmission.

The sum of the opposite phase effect in the case of not performing the frequency hopping and the spread spectrum effect of the maximum shift width frequency hopping in the case of not performing the opposite phase process is calculated. The leakage magnetic field reduction effect of the maximum shift width frequency hopping in the case of performing the opposite phase process is subtracted from the above sum to calculate a difference. That difference is indication of the decrease in the leakage magnetic field reduction effect.

For example, when the difference is smaller than a threshold with respect to the difference or when the difference is equal to or smaller than the threshold, the leakage magnetic field reduction effect may be determined not to have decreased much and the shift width limit may thus not be applied. On the contrary, only when the difference is equal to or larger than the threshold with respect to the difference or when the difference exceeds the threshold, the shift width limit may be applied.

The threshold with respect to the difference may be assumed to be about 1 dB to 3 dB. For example, in a case where the threshold with respect to the difference is 3 dB, when the decrease in the leakage magnetic field reduction effect has exceeded 3 dB, the decrease in the leakage magnetic field reduction effect is assumed to become unacceptable, and it can be said that it is better to apply the shift width limit.

Figure 12:
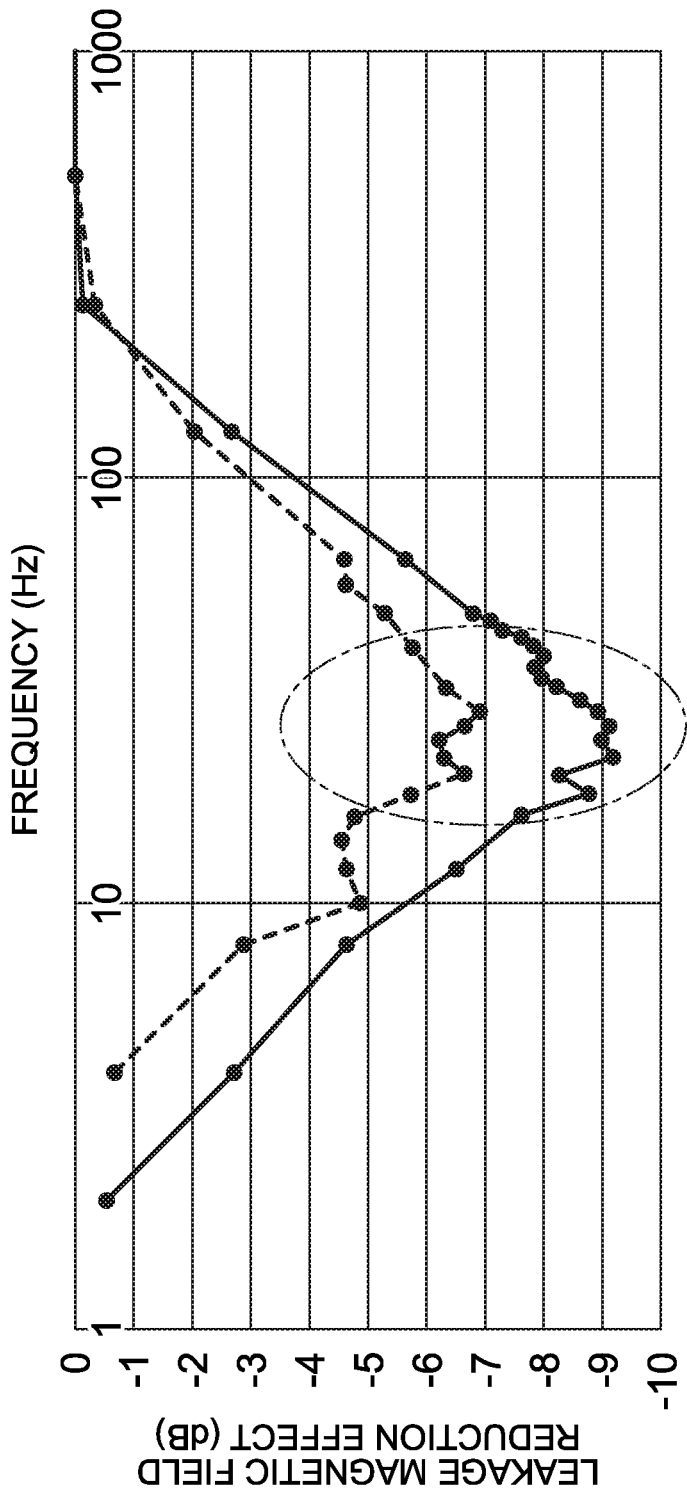
FIG. 12 is a graph illustrating a decrease in leakage magnetic field reduction effect by the frequency hopping.

FIG. 12 is a graph illustrating the decrease in the leakage magnetic field reduction effect by the frequency hopping. The horizontal axis represents the frequency and the vertical axis represents the leakage magnetic field reduction effect. The leakage magnetic field reduction effect becomes larger and the leakage magnetic field is reduced more as the negative value becomes larger (as the graph goes down). A dotted-line graph indicates the leakage magnetic field reduction effect in the case of using six shift values with a shift width fixed to 400 kHz. In this case, the spread bandwidth is 2.4 GHz. A solid-line graph indicates the leakage magnetic field reduction effect in the case of using six shift values with a shift width fixed to 800 kHz. The spread bandwidth in this case is 4.8 GHz, which is twice of the frequency band concerning the solid-line graph.

As illustrated in FIG. 12, the leakage magnetic field reduction effect in the 4.8-GHz frequency band is mostly 3 dB lower than the leakage magnetic field reduction effect in the 2.4-GHz frequency band. It is found therefrom that when the spread bandwidth is made twice as large, the 3-dB leakage magnetic field reduction effect can be obtained. It can be said therefrom that when the leakage magnetic field reduction effect can be improved 3 dB or more by limiting the shift width, the frequency band to be used can be reduced to half, and it can be said to be efficient. It can thus be said that it is better to apply the shift width limit when the leakage magnetic field reduction effect is larger by 3 dB or more in the case of limiting the shift width than in the case of not limiting the shift width.

The power transmission controller 13 may determine whether or not to apply the shift width limit. Alternatively, the reduction effect calculation device 3 may perform the determination and transmit the determination result to the power transmission controller 13.

Alternatively, the upper limit value for the shift width may be calculated on the basis of the result of the measurement of the reduction effect calculation device 3. When the upper limit value is estimated from a component configuration, component variation characteristics, or the like at the time of designing, the upper limit value might become excessive. However, by calculating the upper limit value on the basis of the measurement result of the reduction effect calculation device 3, the upper limit value becomes a more accurate value.

For example, the shift width is taken as a parameter, and the shift width is changed to calculate a plurality of leakage magnetic field reduction effects in the case of performing both the opposite phase process and the frequency hopping. Moreover, as in the case of determining the shift width limit, the sum of the opposite phase effect in the case of not performing the frequency hopping and the leakage magnetic field reduction effect of the maximum shift width frequency hopping in the case of not performing the opposite phase process is calculated. Then, the leakage magnetic field reduction effect in the case of performing the opposite phase process and the frequency hopping is subtracted from the above sum to calculate a difference. On the basis of that difference, the upper limit value is set. For example, as in the case of determining the shift width limit, the shift width at the time of the difference being about the threshold such as 3 dB may be taken as the upper limit value.

Alternatively, the power transmission controller 13 calculates the sum of the leakage magnetic field reduction effect only by the frequency shifting in the case of sequentially shifting the frequency with the shift width being the upper limit value and the leakage magnetic field reduction effect by the cancellation of the magnetic fields in the case of not shifting the frequency. Then, the power transmission controller 13 may set the upper limit value such that the sum substantially matches the leakage magnetic field reduction effect by both the frequency shifting and the cancellation of the magnetic fields in the case where the frequency sequentially shifts with the shift width being twice of the upper limit value. Also, in this manner, the frequency band to be used can be reduced to half, and it can be said to be efficient.

The shift width limit described thus far has been the limit on the shift width set by the upper limit value. However, there is also a limit to reduction in the shift width. The radio frequency signal is typically generated by the inverter 1412 dividing a signal from a clock source called a master clock whose frequency is a relatively high. Hence, the shift width cannot be reduced exceeding the limit for resolution of the master clock. Therefore, the limit may be imposed on the shift width by a lower limit value in accordance with the master clock in the electric power transmission device 1. On the contrary, the lower limit value for the shift width may be set and the master clock to be mounted in the electric power transmission device 1 may be selected.

As described above, according to the third embodiment, by using the leakage magnetic field reduction effect calculated by the reduction effect calculation device 3, it is possible to determine whether or not to apply the shift width limit and perform more flexible electric power transmission.

In the embodiments thus far, as illustrated in FIGS. 6 and 7, when the frequency hopping is made cyclic, the frequency hopping cycle is preferably set so as to substantially the reciprocal of the reference band for the corresponding resolution bandwidth (RBW). In the international special committee on radio interference (CISPR) standard, it is defined that when a frequency band concerning measurement is a band A from 9 kHz to 150 kHz, a resolution bandwidth to be set in the measurement instrument is from 100 Hz to 300 Hz. It is also defined that the reference band concerning that resolution bandwidth is 200 Hz. It is also defined that when the frequency band concerning measurement is a band B from 150 kHz to 30 MHz, the resolution bandwidth is from 8 kHz to 10 kHz. It is also defined that the reference band concerning that resolution bandwidth is 9 kHz. Thus, when the 85-kHz band is taken as a target, the frequency hopping cycle is preferably set to about 0.5 msec (1/200 Hz).

Figure 13:
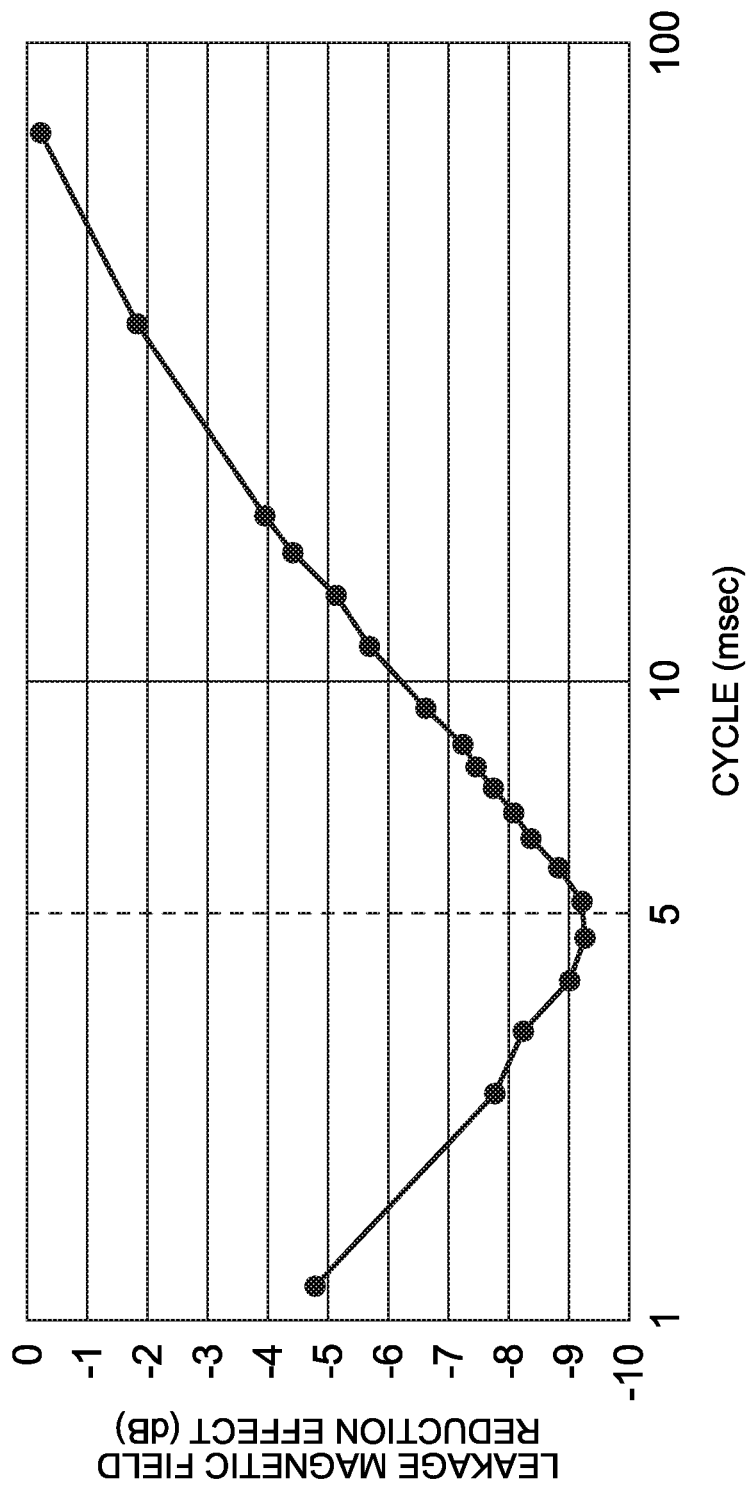
FIG. 13 is a graph illustrating the relationship between a cycle and the leakage magnetic field reduction effect.

FIG. 13 is a graph illustrating the relationship between the cycle and the leakage magnetic field reduction effect. The horizontal axis represents the cycle of frequency hopping performed on a frequency that corresponds to the resolution bandwidth of about 200 Hz by using twelve shift values with a shift width fixed to 400 Hz. The vertical axis represents a value of the leakage magnetic field reduction effect in that cycle. Around a frequency hopping cycle of 5 msec, the graph is at the minimum, which shows that the largest leakage magnetic field reduction effect is obtained. This shows that a favorable reduction effect can be obtained in the case the frequency hopping cycle is substantially matched with the reciprocal of the reference band for the resolution bandwidth corresponding to the target frequency. When an effective range for the leakage magnetic field reduction effect is set to be a range to a value about 3 dB smaller than the maximum value (in FIG. 13, a range below −7 dB of the leakage magnetic field reduction effect), the cycle is set so as to be included in a range from one fourth of the reciprocal of the reference band to twice of the reciprocal of the reference band for the first resolution bandwidth (a range from 1/(4 RBW) to 2/RBW).

Further, in addition to reducing the leakage magnetic field in the used frequency, reducing the leakage magnetic field in a harmonic wave is also important. For example, when 85 kHz is taken as the used frequency, a third harmonic wave appears at 255 kHz, a fifth harmonic wave appears at 425 kHz, and a seventh harmonic wave appears at 595 kHz, the harmonic waves being odd-number harmonic waves.

As described above, in the CISPR standard, the resolution bandwidth with respect to the fundamental wave of 85 kHz is about 200 kHz and the resolution bandwidth with respect to each harmonic wave is about 9 kHz, and the difference is about 45 times. When the frequency hopping cycle is set with the resolution bandwidth with respect to the fundamental wave of 85 kHz taken as a reference, the reduction effect by the frequency hopping in each harmonic wave is limited. Therefore, by including the frequency hopping cycle in a range from the reciprocal of the resolution bandwidth of the harmonic wave to the reciprocal of the resolution bandwidth of the fundamental wave, it is possible to obtain the leakage magnetic field reduction effect on the harmonic wave as well as on the fundamental wave.

Although each process in the present embodiment is assumed to be achieved in a dedicated circuit, the process regarding the circuit control, such as specifying the timing for changing the frequency, may be achieved by the CPU executing a program stored in a memory.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An electric power transmission device comprising:
a plurality of power transmitters which respectively generate magnetic fields; and
a power transmission controller which controls the power transmitters to bring the corresponding magnetic fields into desired states,
wherein:
phases of the magnetic fields are set such that the magnetic fields cancel out at least part of each other,
frequencies of the magnetic fields shift to a same value at a same timing, and
a shift width of each of the frequencies of the magnetic fields for one-time shifting is limited by an upper limit value.

2. The electric power transmission device according to claim 1, wherein a leakage magnetic field reduction effect by the cancellation of the magnetic fields decreases due to transient responses of the power transmitters at the time of shifting of the frequencies, but the decrease is reduced by the upper limit value.

3. The electric power transmission device according to claim 2, wherein the upper limit value is set so as to hold the decrease of the leakage magnetic field reduction effect within 3 dB.

4. The electric power transmission device according to claim 1, wherein a part of a shifting form of the frequency is a triangular waveform or a sine waveform.

5. The electric power transmission device according to claim 1, wherein shifting of the frequency is repeated in a fixed cycle.

6. The electric power transmission device according to claim 5, wherein the cycle substantially matches a reciprocal of a reference band for a first resolution bandwidth, wherein the first resolution bandwidth corresponds to the frequency and is for measuring a leakage magnetic field.

7. The electric power transmission device according to claim 5, wherein the cycle ranges from one-fourth to twice of a reciprocal of a reference band for a first resolution bandwidth, wherein the first resolution bandwidth corresponds to the frequency and is for measuring a leakage magnetic field.

8. The electric power transmission device according to claim 5, wherein:
the cycle is smaller than a reciprocal of a reference band for a first resolution bandwidth, wherein the first resolution bandwidth corresponds to the frequency and is for measuring a leakage magnetic field; and
the cycle is larger than a reciprocal of a reference band for a second resolution bandwidth that is intended for a higher band than the first resolution bandwidth.

9. The electric power transmission device according to claim 1, wherein the shift width is equal to or larger than a reciprocal of a reference band for a first resolution bandwidth, wherein the first resolution bandwidth corresponds to the frequency and is for measuring a leakage magnetic field.

10. The electric power transmission device according to claim 1, wherein:
the power transmission controller receives an input value with respect to the shift width, and
the power transmission controller determines a value of the shifting frequency based on the input value only when the input value satisfies the upper limit value.

11. The electric power transmission device according to claim 1,
wherein the power transmission controller conducts:
a first test for only performing the cancellation of the magnetic fields without shifting the frequencies;
a second test for only shifting the frequencies without performing the cancellation of the magnetic fields; and
a third test for performing both the cancellation of the magnetic fields and the shifting of the frequencies, and
wherein the upper limit value is determined based on field intensities measured in the first test to the third test.

12. An electric power transmission system which transmits power in a contactless manner, the system comprising:
an electric power transmission device; and
an electric power reception device,
wherein:
the electric power transmission device comprises:
a plurality of power transmitters which respectively generate magnetic fields; and
a power transmission controller which controls the power transmitters to bring the corresponding magnetic fields into desired states,
the electric power reception device comprises a power receiver which generates a radio frequency current by using each of the magnetic fields,
phases of the magnetic fields are set such that the magnetic fields cancel out at least part of each other, frequencies of the magnetic fields shift to a same value at a same timing, and a shift width of each of the frequencies of the magnetic fields for one-time shifting is limited by an upper limit value.

13. The electric power transmission system according to claim 11, further comprising:

a measurement device which measures an intensity of the magnetic field, wherein the power transmission controller conducts:

a first test for only performing the cancellation of the magnetic fields without shifting the frequencies;

a second test for only shifting the frequencies without performing the cancellation of the magnetic fields; and a third test for performing both the cancellation of the magnetic fields and the shifting of the frequencies, wherein the measurement device measures field intensities in the first test to the third test, and wherein the power transmission controller determines the upper limit value based on the measured field intensities.

14. An electric power transmission device comprising:

a first to an n-th (n>1) power transmitter which generate a first to an n-th magnetic field respectively; and a power transmission controller which controls at least one of the first to n-th power transmitters to control at least one of phases and frequencies of the first to n-th magnetic fields, wherein:

phases of the first to n-th magnetic fields are set such that the first to n-th magnetic fields cancel out, at least in part, one another, frequencies of the first to n-th magnetic fields shift to a same value at a same timing, and a shift width of each of the frequencies for one-time shifting is limited by an upper limit value.

15. An electric power transmission system which transmits power in a contactless manner, the system comprising:

an electric power transmission device; and an electric power reception device, wherein the electric power transmission device comprises:

a first to an n-th (n>1) power transmitter which generate a first to an n-th magnetic field; and a power transmission controller which controls at least one of the first to n-th power transmitters to control at least one of phases and frequencies of the first to n-th magnetic fields, the electric power reception device comprises a power receiver which generates a radio frequency current by using at least one of the first to n-th magnetic fields, phases of the first to n-th magnetic fields are set such that the first to n-th magnetic fields cancel out, at least in part, one another, frequencies of the first to n-th magnetic fields shift to a same value at a same timing, and a shift width of each of the frequencies for one-time shifting is limited by an upper limit value.

* * * * *